(12) United States Patent
Tormasov et al.

(10) Patent No.: US 12,346,441 B2
(45) Date of Patent: Jul. 1, 2025

(54) SYSTEMS AND METHODS FOR SYNTHETIC FILE SCANNING

(71) Applicant: Acronis International GmbH, Schaffhausen (CH)

(72) Inventors: Alexander Tormasov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 497 days.

(21) Appl. No.: 17/393,774

(22) Filed: Aug. 4, 2021

(65) Prior Publication Data

US 2022/0050899 A1   Feb. 17, 2022

Related U.S. Application Data

(60) Provisional application No. 63/066,423, filed on Aug. 17, 2020.

(51) Int. Cl.
*G06F 21/56* (2013.01)
*G06F 21/55* (2013.01)

(52) U.S. Cl.
CPC .......... *G06F 21/565* (2013.01); *G06F 21/552* (2013.01); *G06F 21/568* (2013.01)

(58) Field of Classification Search
CPC ....... H04L 63/00; G06F 21/56; G06F 21/552; G06F 21/562; G06F 21/565; G06F 21/568; G06F 11/1451
See application file for complete search history.

(56) References Cited

U.S. PATENT DOCUMENTS

| | | | |
|---|---|---|---|
| 10,169,581 B2 * | 1/2019 | Tsao | G06F 21/56 |
| 2008/0134163 A1 * | 6/2008 | Golde | G06F 9/4486 |
| | | | 711/E12.001 |
| 2015/0286437 A1 * | 10/2015 | Coronado | G06F 3/065 |
| | | | 711/162 |
| 2017/0177867 A1 * | 6/2017 | Crofton | G06F 21/565 |
| 2018/0293382 A1 * | 10/2018 | Murphy, Jr. | G06F 21/561 |

* cited by examiner

*Primary Examiner* — Bassam A Noaman
(74) *Attorney, Agent, or Firm* — ArentFox Schiff LLP; Michael Fainberg (57) ABSTRACT

Disclosed herein are systems and method for synthetic file scanning. In one exemplary aspect, a method may comprise, for each respective file in a plurality of files on a storage device, determining a respective likelihood of the respective file being targeted by the malicious activity, and including, in a subset of files, each respective file in the plurality of files with a respective likelihood that is greater than a threshold likelihood. The method may comprise for each respective file in the subset of files, identifying at least one fragment of the respective file that is susceptible to the malicious activity. The method may comprise extracting and storing at least one fragment from each respective file in a synthetic file, and scanning the synthetic file periodically instead of the plurality of files.

18 Claims, 4 Drawing Sheets

SYSTEMS AND METHODS FOR SYNTHETIC FILE SCANNING

CROSS-REFERENCE TO RELATED APPLICATIONS

This application claims the benefit of U.S. Provisional Application No. 63/066,423, filed Aug. 17, 2020, which is herein incorporated by reference.

FIELD OF TECHNOLOGY

The present disclosure relates to the field of data security, and, more specifically, to systems and methods for generating and scanning a synthetic file.

BACKGROUND

Anti-virus scanners are often utilized for preventative and remediation measures in data security. In the context of data backups, anti-virus scanners are periodically used to ensure that the data being backed up is not corrupt or infected. In some cases, a rescan is needed whenever a new virus definition is added to the anti-virus scanning software. In other cases, a rescan is needed whenever a file in the backup is modified or a new file is uploaded.

Depending on the size of the data backup, however, rescanning the backup in its entirety can be a hassle. This is because rescanning may require a lot of processing, can be time-consuming, and may simply result in false positives or no infections found. A majority of the time, anti-virus scanners spend resources of a computing device to scan clean files. Those resources, whether its RAM or CPU power, can better be used for other functions of the computing device.

There thus exists a need to optimize when and where anti-virus scanners are utilized by minimizing the number of potentially clean files that an anti-virus scanner has to scan.

SUMMARY

To address these shortcomings, aspects of the disclosure describe methods and systems for synthetic file scanning. In one exemplary aspect, a method may comprise identifying, on a storage device, a plurality of files that are scanned periodically for malicious activity. The method may comprise, for each respective file in the plurality of files, determining a respective likelihood of the respective file being targeted by the malicious activity, and including, in a subset of files, each respective file in the plurality of files with a respective likelihood that is greater than a threshold likelihood. The method may comprise for each respective file in the subset of files, identifying at least one fragment of the respective file that is susceptible to the malicious activity, based on characteristics of the malicious activity. The method may comprise extracting the at least one fragment from each respective file, storing the extracted at least one fragment from each respective file in a synthetic file, wherein contents of the synthetic file are arranged in accordance with storage addresses of each respective file in the subset of files, and scanning the synthetic file periodically instead of the plurality of files.

In some aspects, the synthetic file further comprises, for each respective fragment, a respective pointer that points to a respective storage address of the respective fragment.

In some aspects, the method may comprise detecting a change in a fragment on the storage device, and updating a corresponding fragment in the synthetic file in accordance with the change using a pointer for the corresponding fragment.

In some aspects, the method may comprise determining, based on the scanning, that a fragment in the synthetic file has been targeted by the malicious activity, identifying a file in the storage device that comprises a corresponding fragment, and performing a remediation action on the file, wherein the remediation action is one of: file removal and file quarantine.

In some aspects, the method may comprise determining, based on the scanning, that the synthetic file is uninfected, marking each respective file whose fragment is included in the synthetic file as a clean file.

In some aspects, the method may comprise storing an identifier of each respective file, and deleting the synthetic file.

In some aspects, the plurality of files are comprised in a first backup of the storage device. The method may comprise receiving a second backup of the storage device, determining a first subset of files in the second backup that have been modified since the first backup, identifying, from the first subset of files, a second subset of files that match with the stored identifiers, and storing fragments from the second subset of files in a new synthetic file without re-determining likelihoods of the second subset of files being targeted by the malicious activity.

In some aspects, identifying the at least one fragment of the respective file that is susceptible to the malicious activity based on characteristics of the malicious activity further comprises determining a target location of the malicious activity based on historic attacks, identifying the target location in the respective file in the subset of files, and identifying the at least one fragment of the respective file that comprises the target location.

In some aspects, the plurality of files are comprised in a backup, wherein a unique synthetic file is created for each backup.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating and scanning a synthetic file. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To overcome the issues discussed above, the present disclosure describes implementations of systems and methods that analyze data stored in a data backup and isolate any components and file fragments in the data backup that can potentially be infected with malicious programs. These may be separate files or parts of files that are separable into independent data arrays. The isolated files and file fragments are added to a single "synthetic file," which is organized according to an index principle, that is, the synthetic file not only stores the selected fragments, but also stores links to the original storage location of these files and fragments in the data backup. Rather than scanning the data backup, the synthetic file is scanned. This reduces the amount of time spent on scanning and reduces the chances of clean files being scanned repeatedly.

In the context of the present disclosure, the format of a synthetic file is configured such that it is available for scanning by standard anti-virus programs. That is, the internal structure is understandable for the anti-virus program without any additional parsing. The difference between a synthetic file and quarantine folders or storing information about files is that such folders contain only whole files, but not file fragments. A synthetic file is a single file constructed from a combination of standard file fragments, headers, and fields. For example, a PDF document has different fields. Instead of parsing files each time, only the components that may contain malicious code or viruses are placed into an artificial file in advance. For example, in the PDF document, images embedded in the file that are not malicious do not need to be scanned. In an example of Microsoft Word™ files, only portions that contain macros (which can potentially contain viruses) need to be scanned.

Accordingly, the present disclosure describes taking a large number of files (e.g., 100,000 Word files), extracting the fragments that contain macros, and placing all these fragments into a single "synthetic" Word document that is artificial in nature, but fully corresponds to the format of such documents. Thus, in some aspects, the synthetic file shares an extension (e.g., doc) as the fragments it is composed of.

The structure and format of standard files are known, which enables the extraction of solely the fields or components that are of interest for scanning and the assembly of an "artificial" file of the same format. This allows for a significant reduction on the processing load on an antivirus software, which no longer has to unpack/unzip, analyze, and scan every single file independently.

In some aspects, the synthetic file may have a special "universal" format, which can include fragments of files of several different formats (e.g., different extensions). The anti-virus program may then be configured to be compatible with the universal format.

Figure 1:
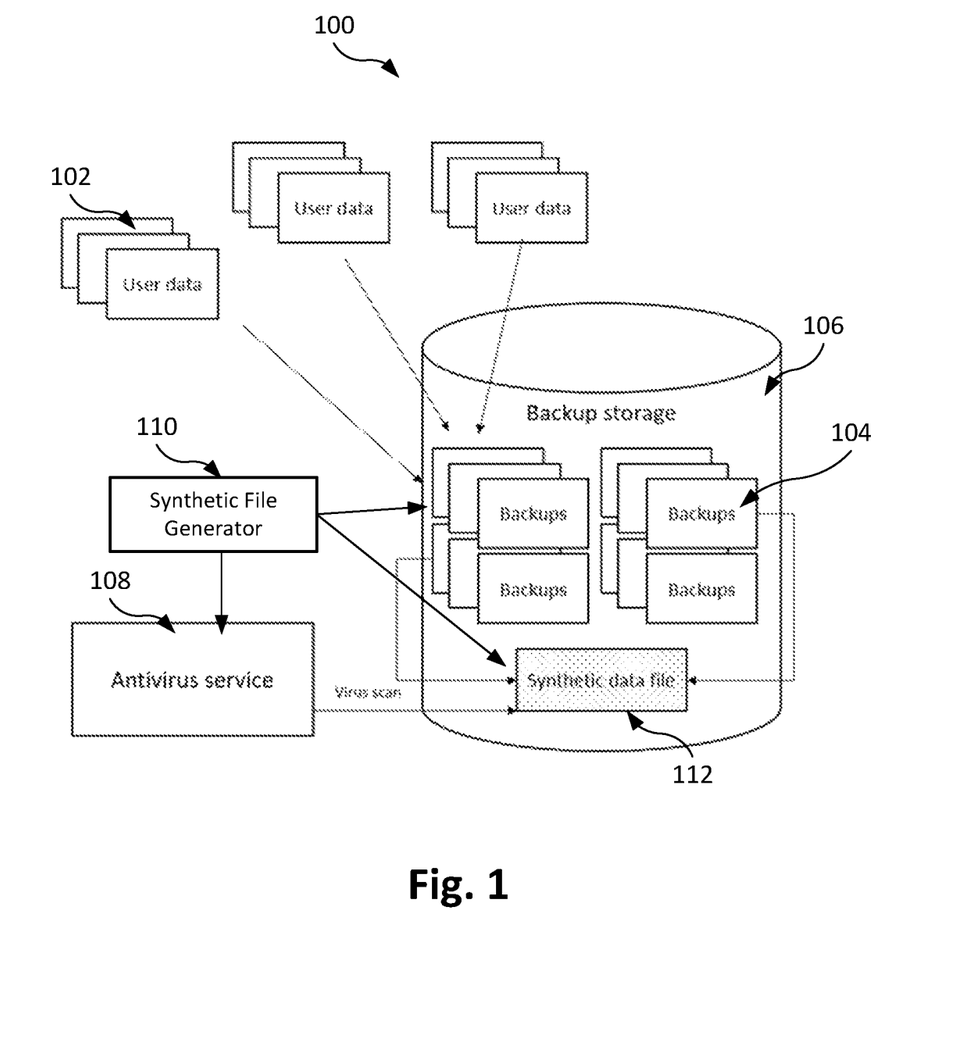
FIG. 1 is a block diagram illustrating a system for generating and scanning a synthetic file, in accordance with aspects of the present disclosure.

FIG. 1 is a block diagram illustrating system 100 for generating and scanning a synthetic file, in accordance with aspects of the present disclosure. System 100 comprises user data 102 that is uploaded to backup storage 106. Over several iterations of uploading periodically, a plurality of backups 104 may be stored on backup storage 106. For example, one of backups 104 may represent user data 102 at time t1 and another backup of backups 104 may represent user data 102 at time t2. Conventionally, antivirus service 108 scans each of backups 104 to determine whether a file is infected. A new backup that is recently uploaded may be scanned to check if one of the files was infected in the originating device and is now copied to backup storage 106. An older backup may be scanned to check if one of the files is infected in backup storage 106 post-upload by malicious activity targeting backup storage 106. As discussed previously, however, scanning each of backups 104 in their entirety is inefficient.

Accordingly, the present disclosure discusses implementations of synthetic file generator 110 that generates synthetic data file 112. In some aspects, antivirus service 108 is a software stored on backup storage 106, which is a computing device such as a server. Synthetic file generator 110 may be a module of antivirus service 108 that narrows down the scanning of antivirus service 108 to files in backups 104 that are likely to be targeted by malicious activity and more particularly the portions of those files where malicious activity infiltrates the files. In some aspects, synthetic file generator 110 may be a standalone software that intercepts uploads of user data 102 during backup, identifies the target fragments of prone files, and instructs antivirus service 108 on what to scan.

For example, during backup, synthetic file generator 110 may extract, from files that are typically scanned by service 108, a set of potentially vulnerable data (e.g., macros/scripts from text editors, code from DLL and executable files, boot records, binaries from mail attachment/archives, etc.). Synthetic file generator 110 may store the vulnerable data separately from backups 104. Prior to the next scan by antivirus service 108, synthetic file generator 110 may artificially construct synthetic file(s) of an appropriate format that only have the set of potentially vulnerable data and may provide the synthetic file(s) to service 108, eliminating the need to scan the original files.

In some aspects, the synthetic file (e.g., file 112) may also comprise a record with a plurality of pointers pointing to the addresses of the original fragments in backup storage 106. Synthetic file generator 110 may further detect duplicates of a file in backups 104 and only include additional pointers to the duplicate fragments (rather than the duplicate fragments themselves) to prevent the same fragment from being scanned multiple times. When an original fragment of a file is updated in backups 104, the corresponding fragment in synthetic data file 112 is also updated by synthetic file generator 110 in the same manner. For example, synthetic file generator 110 may copy the updated version of the fragment and replace the copy with the existing fragment in synthetic data file 112.

Figure 2:
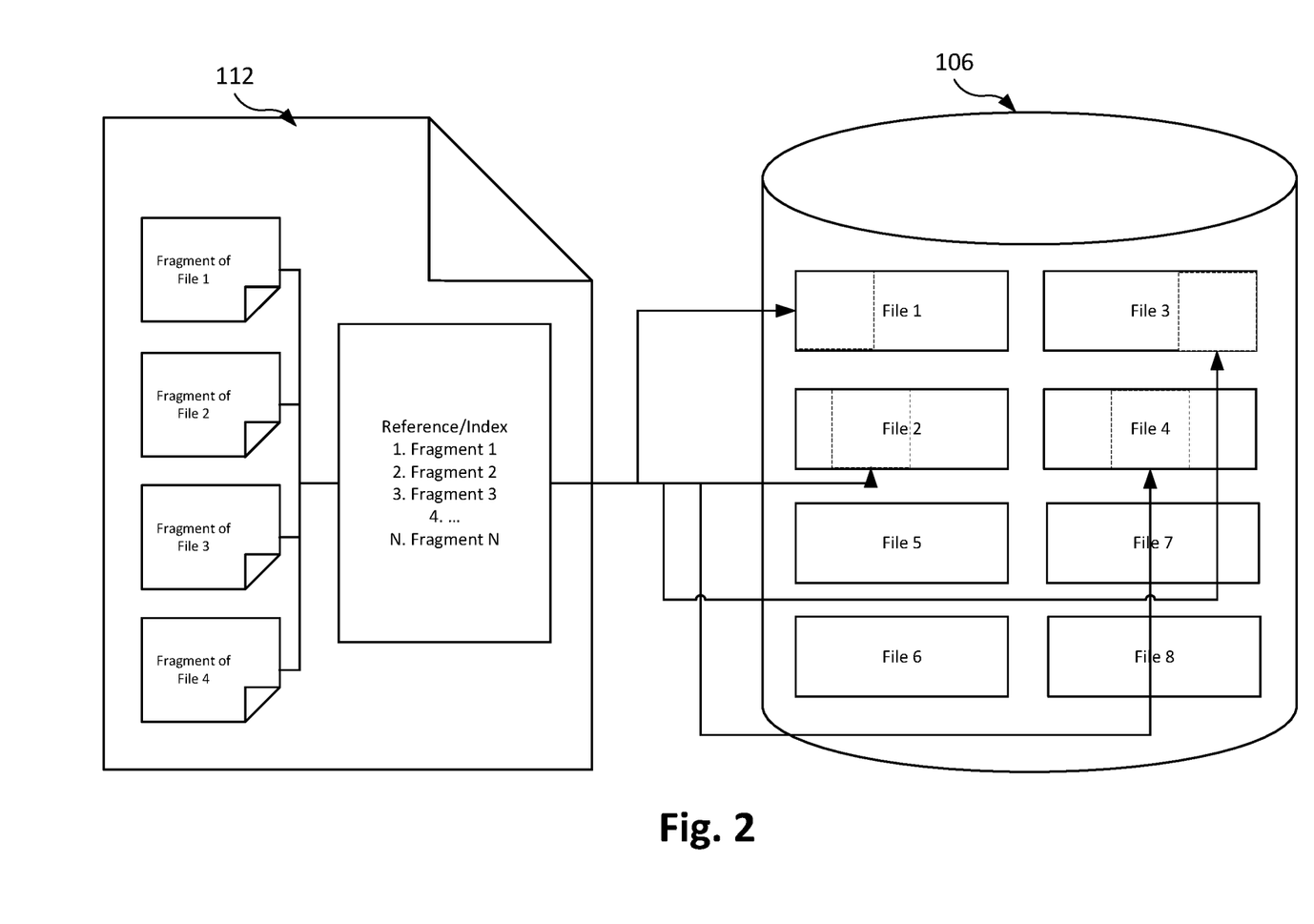
FIG. 2 is a block diagram illustrating contents of the synthetic file, in accordance with aspects of the present disclosure.

FIG. 2 is a block diagram illustrating contents of synthetic data file 112, in accordance with aspects of the present disclosure. It should be noted that FIG. 2 only depicts an example of how synthetic data file 112 may be set up and that synthetic data file 112 can comprise any number of fragments.

In FIG. 2, backup storage 106 comprises eight files. Synthetic file generator 110 may determine that files 1-8 on a backup storage device 106 are scanned periodically for malicious activity by antivirus service 108. For example, files 1-8 may be scanned every other day, or when at least one file is modified, or when a file is added or removed from backup storage 106. For each respective file in the plurality of files (e.g., files 1-9), synthetic file generator 110 determines a respective likelihood of the respective file being targeted by the malicious activity. The likelihood may be a quantitative value (e.g., a percentage, a fraction, a whole number, etc.) or a qualitative value (e.g., "not likely," "very likely," "likely," etc.).

Synthetic file generator 110 may employ a plurality of rules to classify which likelihood is associated with the respective file. Some rules may be focused on the attributes of the respective file. For example, a rule may assess whether the file is larger than a threshold size. If it is, the likelihood of being targeted may be higher.

Other rules may be focused on the characteristics of the malicious activity. For example, a rule may assess whether any of the virus definitions target the extension of the file. For example, a ransomware called "cryptolocker" is known to encrypt files and demand money in exchange for the unlocking key. Cryptolocker conventionally target files that contain sensitive information for businesses—particularly files with extensions such as odt, doc, docx, xls, ppt, etc. Accordingly, synthetic file generator 110 may determine that a file with the extension docx will have a "likely" chance of being targeted.

In some aspects, not every docx file may be valuable to a user. Thus, synthetic file generator 110 may assess likelihood based on both the attributes of the file and the characteristics of the malicious activity. In this case, a file with the docx extension that is rarely accessed by the user may not be considered a target. For example, a "readme" file of an application in an installation directory that has never been accessed by the user may have a low likelihood of being targeted. Accordingly, synthetic file generator 110 may determine that the readme file has a "not likely" likelihood.

Synthetic file generator 110 may include, in a subset of files, each respective file in the plurality of files with a respective likelihood that is greater than a threshold likelihood. Referring to FIG. 2, synthetic file generator 110 may determine that files 1-4 have a likelihood (e.g., "very likely") that is greater than a threshold likelihood (e.g., "likely"). Synthetic file generator 110 may henceforth identify files 1-4 as being part of a subset of files that may be targeted by malicious activity.

Subsequently, for each respective file in the subset of files, synthetic file generator 110 may identify at least one fragment of the respective file that is directly targeted by the malicious activity based on characteristics of the malicious activity. For example, there may be known regions of a given file where a virus can infect some executable code. These regions can be identified using virus definitions to determine how and where the virus infects a file. Consider an example in which the user data comprises a web browser application. The vulnerable fragment of the application may be a plugin that is accessed via the web browser application's toolbar (i.e., the plugin may collect and forward data to an unauthorized entity). In this case, rather than adding the entire application into the synthetic file, generator 110 may only include the component (e.g., code) that interacts with plugins.

Furthermore, these vulnerable regions can be identified by synthetic file generator 110, which can refer to a database of historic attacks. The database may list metadata regarding a file and identify what region of the file was attacked. Synthetic file generator 110 may subsequently compare the metadata of the file historically attacked with the file that is likely to be targeted by malicious activity. In response to determining a similarity between the respective files, synthetic file generator 110 may identify the fragment of the file historically attacked file that was directly targeted, and detect a corresponding fragment in the file of backup storage 106. FIG. 2 depicts fragments of files 1-4 bounded by dashed lines that would be directly targeted by malicious activity. In some aspects, an entire file may be directly targeted. For example, in the case where ransomware encrypts the file, synthetic file generator 110 may determine that the entire file should be included in the synthetic data file 112.

Synthetic file generator 110 may then extract the at least one fragments from each respective file (e.g., files 1-4) by creating a copy of the fragments, and may generate synthetic data file 112. Synthetic data file 112 is a container for a plurality of files. In some aspects, synthetic data file 112 is a single file in which synthetic file generator 110 stores the extracted at least one fragment from each respective file. It should be noted that data file 112 is not simply a directory comprising multiple file fragments. Data file 112 is a conglomerate object (e.g., a data structure) that has multiple fragments stitched together. In other aspects, there may be multiple synthetic data files, wherein each data file comprises a fragment from a particular type of file. For example, a first synthetic data file may be a conglomeration of fragments from text files, while a second synthetic data file may be a conglomeration of fragments from image files. Synthetic file generator 110 may also include a record comprising references to the addresses of the original fragments in backup storage 106. As depicted in FIG. 2, synthetic data file 112 comprises fragments of files 1-4, respectively, and references (e.g., pointers) to the files in backup storage 106. In some aspects, contents of synthetic file 112 are arranged in accordance with storage addresses of each respective file in the subset of files (e.g., files 1-4).

Having generated the synthetic data file 112, synthetic file generator 110 may then instruct antivirus service 108 to scan synthetic data file 112 instead of the plurality of files in backup storage 106. If synthetic file generator 110 is a module of antivirus service 108, antivirus service 108 may automatically begin scanning the synthetic data file instead of the original files. In some aspects, synthetic file generator 110 may generate or update synthetic data file 112 before each periodic scan by antivirus service 108. In some aspects, generator 110 may encrypt synthetic data file 112 because it may contain sensitive information—particularly from multiple files that are likely targets of malicious activity.

In terms of updating synthetic data file 112, synthetic file generator 110 may detect a change in a fragment on the storage device (e.g., backup storage 106). For example, a user may edit a text file from which a fragment is stored in synthetic data file 112. Accordingly, synthetic file generator 110 may update a corresponding fragment in synthetic file 112 in accordance with the change using a pointer for the corresponding fragment.

In some aspects, synthetic file generator 110 may determine, based on the scanning, that a fragment in the synthetic file 112 has been targeted by the malicious activity. In response, synthetic file generator 110 may identify a file in the storage device that comprises a corresponding fragment, and perform a remediation action on the file. For example, synthetic file generator 110 may remove the file from backup storage 106 or quarantine the file. More specifically, anti-virus service 108 may scan synthetic file 112. If the synthetic file 112 is not infected based on the scan, synthetic file generator 110 determines that all files associated with the fragments making up synthetic file 112 are not infected. In some aspects, synthetic file 112 may then be dissolved or deleted because the files are marked by generator 110 as "clean." The deletion allows for space to be saved in memory and for sensitive information to be out of reach from malicious entities. In some aspects, generator 110 may also store identifiers of each respective file whose fragment was part of synthetic file 112.

Storing identifiers allows for making subsequent synthetic files easier to generate and scan. Suppose that for a first backup, synthetic file 112 is generated by generator 110 and anti-virus service 108 determines that synthetic file 112 is safe. In a second backup, certain files on the storage device with user data 102 may change. These files may include files that were part of synthetic file 112. Accordingly, synthetic file generator 110 may determine whether files in the subsequent backup match any files identified in the stored identifiers. As these files have already been determined as likely to be targeted by malicious activity, the determination for likelihood can be skipped. Instead, a fragment of the modified file may directly be extracted and included in a new synthetic file.

More specifically, generator 110 may receive a second backup of the storage device and determine a first subset of files in the second backup that have been modified since the first backup. This may be done by comparing hashes between the first backup of files and the second backup of files. In some aspects, the second backup may solely include files that changed between the first and second backup (i.e., incremental/differential backup). Generator 110 may identify, from the first subset of files, a second subset of files that match with the stored identifiers and may store fragments from the second subset of files in a new synthetic file without re-determining likelihoods of the second subset of files being targeted by the malicious activity. In the event that a new file is added in the second backup, generator 110 may reevaluate whether the new file is a likely target of malicious activity and may add a fragment of the file to the new synthetic file accordingly. Thus, each backup gets its own unique synthetic file. If the unique synthetic file is uninfected, it may be deleted by generator 110.

In some aspects, in the event that a synthetic file is determined to be infected based on a scan by anti-virus service 108, generator 110 may mark each respective file whose fragments make up the synthetic file as "potentially infected." Anti-virus service 108 may then scan each potentially infected file individually until the infected file(s) are identified. These infected file(s) may be placed in a quarantine location, or may be removed from the storage device. It should be noted that although this approach relies on scanning files individually, compared to conventional setups, this approach is more efficient. This is because the number of files scanned is less than the total number of files (assuming not all files are likely to be targeted by malicious activity) in the storage device. In addition, anti-virus scanning is generally used as a level of security that addresses the occasional moments when a system is infected. A well-maintained storage device may rarely experience infections or malicious activity. For a majority of the time, synthetic files may be found to be uninfected in a well-maintained storage device and because synthetic file scanning is quicker than scanning through individual files, this approach is overall time efficient. In the rare occasion that an infection or security breach is detected in the synthetic file, all files comprised in the synthetic file may be scanned to ensure proper remediation of the issue.

Figure 3:
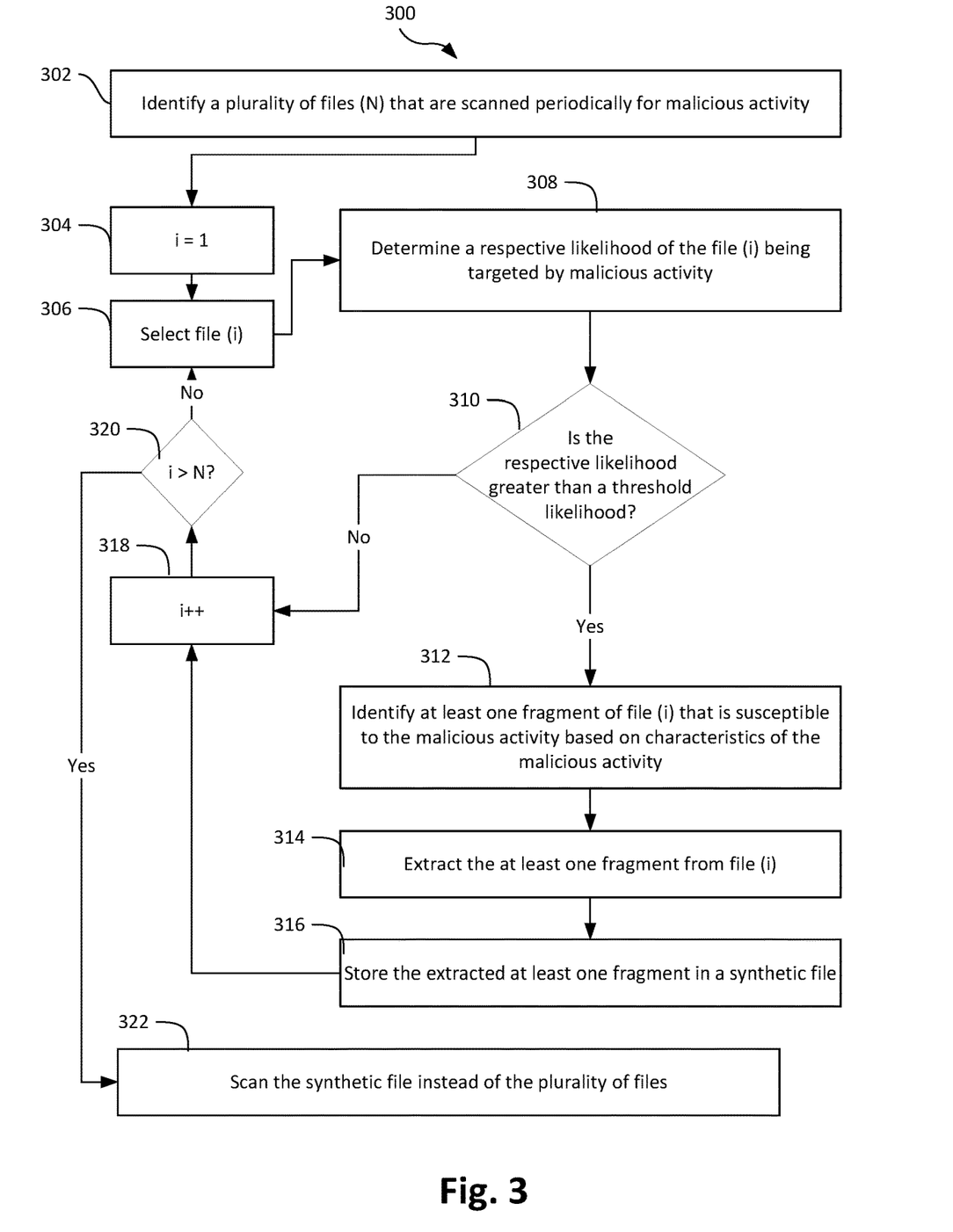
FIG. 3 illustrates a flow diagram of a method for generating and scanning a synthetic file, in accordance with aspects of the present disclosure.

FIG. 3 illustrates a flow diagram of method 300 for generating and scanning a synthetic file, in accordance with aspects of the present disclosure. At 302, synthetic file generator 110 identifies a plurality of files (N) that are scanned periodically for malicious activity. At 304, synthetic file generator 110 sets i=1 to count through all of the files. At 306, synthetic file generator 110 selects file (i). For example, in the first iteration, synthetic file generator 110 selects the first file (e.g., file 1) in the plurality of files.

At 308, synthetic file generator 110 determines a respective likelihood of the file (i) being targeted by malicious activity. At 310, synthetic file generator 110 determines if the respective likelihood is greater than the threshold likelihood. In response to determining that the respective likelihood is greater than the threshold likelihood (indicating that file (i) has a high chance of being targeted), method 300 proceeds to 312, where synthetic file generator 110 identifies at least one fragment of file (i) that is susceptible to the malicious activity based on characteristics of the malicious activity. At 314, synthetic file generator 110 extracts the at least one fragment from file (i). At 316, synthetic file generator 110 stores the extracted at least one fragment in a synthetic file.

At 318, synthetic file generator 110 increments the value of i by 1. For example, in the second iteration, i becomes 2. At 320, synthetic file generator 110 determines whether i is greater than N. For example, if N is 5 (indicating 5 files in the plurality of files) and i is 6, synthetic file generator 110 determines that all of the files have been considered. In response to determining that i is not greater than N, method 300 returns to 306 and selects the next file (e.g., file 2). If, however, i is greater than N, method 300 advances to 322, where synthetic file generator 110 instructs the antivirus scanner to scan the synthetic file-instead of the plurality of files. The scanning of the synthetic file may be periodic in some aspects.

Figure 4:
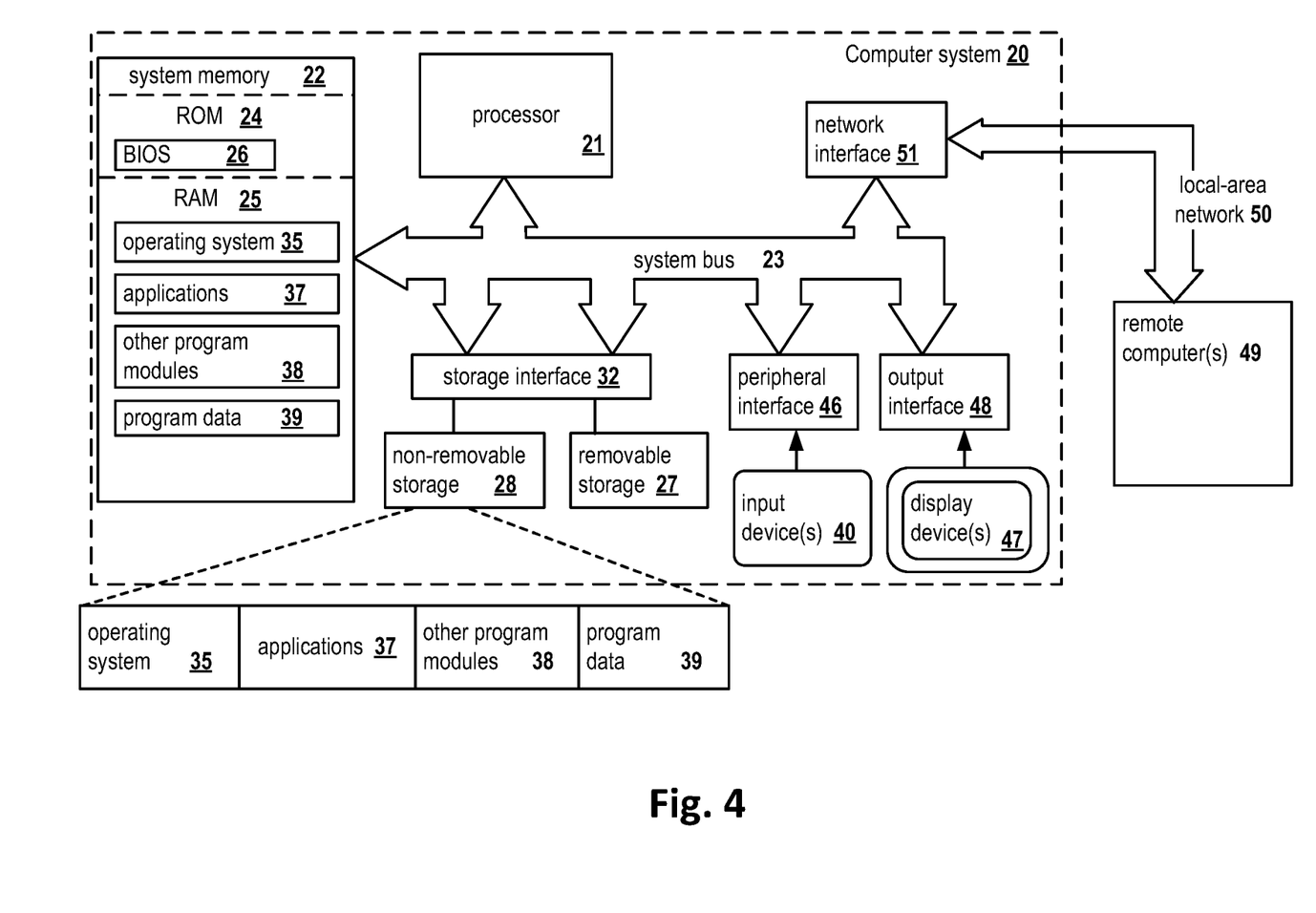
FIG. 4 presents an example of a general-purpose computer system on which aspects of the present disclosure can be implemented.

FIG. 4 is a block diagram illustrating a computer system 20 on which aspects of systems and methods for generating and scanning a synthetic file may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure.

For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for synthetic file scanning, the method comprising:
   identifying, on a storage device, a plurality of files that are scanned periodically for malicious activity;
   for each respective file in the plurality of files, determining a respective likelihood value of the respective file being targeted by the malicious activity;
   including, in a subset of files, each respective file in the plurality of files with a respective likelihood value that is greater than a threshold likelihood value;
   for each respective file in the subset of files, identifying at least one fragment of the respective file that is susceptible to the malicious activity, based on characteristics of the malicious activity;
   extracting the at least one fragment from each respective file;
   storing the extracted at least one fragment from each respective file in a synthetic file in encrypted form, wherein contents of the synthetic file are arranged in accordance with storage addresses of each respective file in the subset of files;
   scanning the synthetic file periodically instead of the plurality of files, wherein the synthetic file is updated before each periodic scan;
   determining, based on the scanning, that the synthetic file is uninfected, wherein determining that the synthetic file is uninfected is indicative that the subset of files in the plurality of files whose fragments make up the synthetic file are uninfected; and
   marking each respective file in the subset of files whose fragment is included in the synthetic file as a clean file.

2. The method of claim 1, wherein the synthetic file further comprises, for each respective fragment, a respective pointer that points to a respective storage address of the respective fragment.

3. The method of claim 2, further comprising:
   detecting a change in a fragment on the storage device;
   updating a corresponding fragment in the synthetic file in accordance with the change using a pointer for the corresponding fragment.

4. The method of claim 1, further comprising: determining, based on the scanning, that a fragment in the synthetic file has been targeted by the malicious activity; identifying a file in the storage device that comprises a corresponding fragment; and performing a remediation action on the file, wherein the remediation action is one of: file removal and file quarantine.

5. The method of claim 1, further comprising: storing an identifier of each respective file; and deleting the synthetic file.

6. The method of claim 5, wherein the plurality of files are comprised in a first backup of the storage device, further comprising: receiving a second backup of the storage device; determining a first subset of files in the second backup that have been modified since the first backup; identifying, from the first subset of files, a second subset of files that match with the stored identifiers; and storing fragments from the second subset of files in a new synthetic file without re-determining likelihood values of the second subset of files being targeted by the malicious activity.

7. The method of claim 1, wherein identifying the at least one fragment of the respective file that is susceptible to the malicious activity based on characteristics of the malicious activity further comprises: determining a target location of the malicious activity based on historic attacks; identifying the target location in the respective file in the subset of files; and identifying the at least one fragment of the respective file that comprises the target location.

8. The method of claim 1, wherein the plurality of files are comprised in a backup, wherein a unique synthetic file is created for each backup.

9. A system for synthetic file scanning, the system comprising: a hardware processor configured to:
   identify, on a storage device, a plurality of files that are scanned periodically for malicious activity;
   for each respective file in the plurality of files, determine a respective likelihood value of the respective file being targeted by the malicious activity;
   include, in a subset of files, each respective file in the plurality of files with a respective likelihood value that is greater than a threshold likelihood value;

for each respective file in the subset of files, identify at least one fragment of the respective file that is susceptible to the malicious activity, based on characteristics of the malicious activity;

extract the at least one fragment from each respective file;

store the extracted at least one fragment from each respective file in a synthetic file in encrypted form, wherein contents of the synthetic file are arranged in accordance with storage addresses of each respective file in the subset of files;

scan the synthetic file periodically instead of the plurality of files, wherein the synthetic file is updated before each periodic scan;

determine, based on the scanning, that the synthetic file is uninfected, wherein determining that the synthetic file is uninfected is indicative that the subset of files in the plurality of files whose fragments make up the synthetic file are uninfected; and mark each respective file in the subset of files whose fragment is included in the synthetic file as a clean file.

10. The system of claim 9, wherein the synthetic file further comprises, for each respective fragment, a respective pointer that points to a respective storage address of the respective fragment.

11. The system of claim 10, wherein the hardware processor is further configured to: detect a change in a fragment on the storage device; update a corresponding fragment in the synthetic file in accordance with the change using a pointer for the corresponding fragment.

12. The system of claim 9, wherein the hardware processor is further configured to: determine, based on the scanning, that a fragment in the synthetic file has been targeted by the malicious activity; identify a file in the storage device that comprises a corresponding fragment; and perform a remediation action on the file, wherein the remediation action is one of: file removal and file quarantine.

13. The system of claim 9, wherein the hardware processor is further configured to: store an identifier of each respective file; and delete the synthetic file.

14. The system of claim 13, wherein the plurality of files are comprised in a first backup of the storage device, wherein the hardware processor is further configured to: receive a second backup of the storage device; determine a first subset of files in the second backup that have been modified since the first backup; identify, from the first subset of files, a second subset of files that match with the stored identifiers; and store fragments from the second subset of files in a new synthetic file without re-determining likelihood values of the second subset of files being targeted by the malicious activity.

15. The system of claim 9, wherein the hardware processor is further configured to identify the at least one fragment of the respective file that is susceptible to the malicious activity based on characteristics of the malicious activity by:

determining a target location of the malicious activity based on historic attacks; identifying the target location in the respective file in the subset of files; and identifying the at least one fragment of the respective file that comprises the target location.

16. The system of claim 9, wherein the plurality of files are comprised in a backup, wherein a unique synthetic file is created for each backup.

17. A non-transitory computer readable medium storing thereon computer executable instructions for synthetic file scanning, including instructions for:

identifying, on a storage device, a plurality of files that are scanned periodically for malicious activity;

for each respective file in the plurality of files, determining a respective likelihood value of the respective file being targeted by the malicious activity;

including, in a subset of files, each respective file in the plurality of files with a respective likelihood value that is greater than a threshold likelihood value;

for each respective file in the subset of files, identifying at least one fragment of the respective file that is susceptible to the malicious activity, based on characteristics of the malicious activity;

extracting the at least one fragment from each respective file;

storing the extracted at least one fragment from each respective file in a synthetic file in encrypted form, wherein contents of the synthetic file are arranged in accordance with storage addresses of each respective file in the subset of files;

scanning the synthetic file periodically instead of the plurality of files, wherein the synthetic file is updated before each periodic scan;

determining, based on the scanning, that the synthetic file is uninfected, wherein determining that the synthetic file is uninfected is indicative that the subset of files in the plurality of files whose fragments make up the synthetic file are uninfected; and marking each respective file in the subset of files whose fragment is included in the synthetic file as a clean file.

18. The non-transitory computer readable medium of claim 17, wherein the synthetic file further comprises, for each respective fragment, a respective pointer that points to a respective storage address of the respective fragment.

* * * * *